April 6, 1954     F. W. MARSHALL     2,674,096
FLOW DAMPING DEVICE

Filed July 10, 1951     2 Sheets-Sheet 1

Franklin W. Marshall INVENTOR.
BY Christy, Parmelee and Strickland
ATTORNEYS.

April 6, 1954   F. W. MARSHALL   2,674,096
FLOW DAMPING DEVICE

Filed July 10, 1951   2 Sheets-Sheet 2

INVENTOR.
Franklin W. Marshall
BY
Christy Parmelee and Strickland
ATTORNEYS.

Patented Apr. 6, 1954

2,674,096

UNITED STATES PATENT OFFICE 2,674,096

FLOW DAMPING DEVICE

Franklin W. Marshall, Pittsburgh, Pa., assignor to Tricon, Inc., Perrysville, Pa., a corporation of Pennsylvania Application July 10, 1951, Serial No. 235,997

20 Claims. (Cl. 60—54.5)

This invention relates to a flow damping device. More particularly, the invention relates to a device to be placed in a pressure line between a machine creating a pressure and an instrument for indicating or recording the pressure generated to reduce flow pulsation, steady the pressure indication, and protect the instrument from shock or damage.

The flow damping device of the present invention is effective for damping the flow under pressure of either liquids or gases, and may be used as a flow dampener for protecting sensitive instruments.

Many different kinds of flow damping devices have been made, but most of them proved to be inaccurate or undependable after they have been used for a comparatively short period.

The primary object of the present invention is to provide a fluid flow damping device which may be easily adapted to give any desired flow rate, and which is constructed to retain indefinitely its flow calibration.

The flow damping device is also very well adapted for use as part of a recoil mechanism, or as a door check, or as a snubber for spring movement of automobiles and other equipment in which the rate of fluid flow is an important feature thereof.

In those forms of apparatus, such as gun recoils, door checks and snubbers, it is desirable that the flow of fluid in one direction may be faster than in the opposite direction. For example it is preferred that with a door closing device, the door may be opened quickly and easily, and when the door is released, that the door shall close slowly and quietly.

Accordingly, another object of the invention is to provide a fluid flow device which is constructed to control fluid flow at different definite rates in opposite directions.

A further object of the invention is to provide a fluid flow controlling device which is simple in construction, inexpensive, and accurate in its flow control.

With these and other objects in view, the invention consists in the fluid flow controlling device hereinafter illustrated and described, and particularly defined in the appended claims.

The various features of the invention are illustrated in the accompanying drawings, in which.

Figure 2:
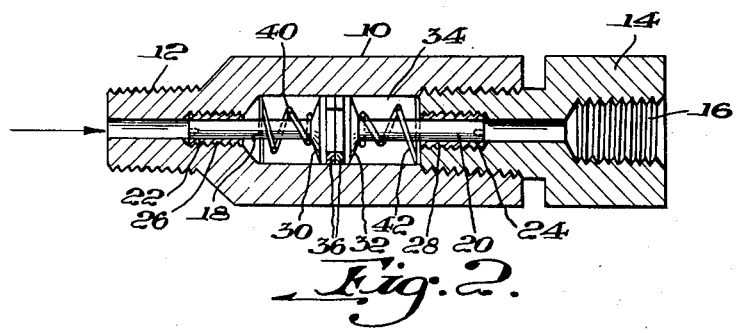
Fig. 2 is a vertical sectional view of a fluid flow controller of the present invention which is particularly adapted for use in damping the flow of pressure fluid for indicating and recording instruments.
Figure 3:
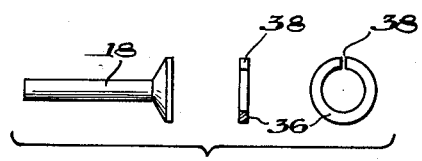
Fig. 3 is a view in side elevation of a piston and a piston ring used in the flow damping device, together with a sectional elevation of the piston ring.

Referring to Fig. 2, the fluid flow controller consists of a tubular body 10 having a threaded input end 12 for a pipe connection, and a plug 14 at the other end having a threaded opening 16 for a pipe connection. Within the body 10 are mounted pistons 18 and 20 which slide in calibrated bores 22 and 24 respectively. The calibrated bore 22 is formed in a bushing 26 which is threaded into an opening in the inlet end of the body 10. The calibrated bore 24 is formed in a bushing 28 which is threaded into an inlet end of the plug 14. Heads 30 and 32 are formed respectively on the ends of the pistons 18 and 20, these heads being slideably mounted in a bore 34 formed in the central portion of the tubular body. Between the heads 30 and 32 are mounted piston rings 36, which rings are made of a trade-marked material "Teflon." "Teflon" is a poly tetra fluoro ethylene plastic that is resistant to strong acids and alkalies and presents an anti-friction surface for movement inside of the bore 34. As illustrated in Fig. 3, the "Teflon" rings have a slit 38 therein which allows the ring to expand to form a tight joint in the bore 34. Two rings 36 are used between the heads 30 and 32, and the slits are preferably positioned at 180° from one another in order to seal the piston formed with the heads 30 and 32 with the rings 36 so that fluid leakage does not occur around the piston.

The flow controller of Fig. 2 is well adapted for the used in dampening the pressure pulsations of a pump for example, pressure fluid from the pump passing through a tube which is connected to the threaded connection 12, and the measuring instrument which preferably contains a Bourdon tube is connected with the threaded opening 16. The pressure fluid from the pump first engages the piston 18, and after the flow control device becomes filled with fluid, the pistons 18 and 20, with piston parts 30, 32 and 36, move in unison. Light springs 40 and 42 are mounted around the pistons 18 and 20 at each side of the piston parts 30, 32 and 36 in order to hold the piston parts 30, 32 and 36 in central position in the bore when the device is not in operation. When the pressure fluid engages the end of the piston 18, fluid passes through the bore 22 into the cavity between the bushing 26 and the piston parts 30, 32 and 36. The movement of fluid into the cavity, together with the piston 18, imparts the pressure of the fluid to the piston 20, and this piston in turn imparts pressure to the fluid between the piston 20 and the Bourdon tube of the measuring instrument. On the return stroke of the pump when the pressure is relieved, the Bourdon tube will act to force the fluid in the opposite direction to place pressure on the piston heads 30 and 32 to set the pistons for the next stroke of the pump. The damping action of the device is based upon the calibration of the bore of the bushings 26 and 28 to permit leakage of fluid around the pistons and into the cavities at the opposite sides of the pistons. In accordance with the rate of flow of fluid through the calibrated bores around the pistons, the damping action of the device is determined. Different sizes of bushings may be used to speed up or decrease the flow of fluid through the bores and thus obtain any desired damping action.

If the pistons 18 and 20 and the rings 36 become separate as illustrated in Fig. 3 an introduction of pressure fluid against the piston head 30 will allow the fluid to pass around the head and through the rings 36 and around the head 32 and piston 20 to the opening communicating with the measuring instrument. Then on the return stroke the parts 32, 36 and 30 will be closed to the position shown in Fig. 2. After fluid is positioned behind each of the piston heads 30 and 32 the packing rings will make a tight joint in the cylindrical bore so that fluid will not leak past the pistons and the piston heads 30 and 32 will move in unison with pistons 18 and 20.

The "Teflon" rings are well adapted for piston rings because they slide with a very little friction on the cylinder bore and make a tight joint therewith. "Teflon" is strong and corrosion resistant, and is also resistant to erosion.

The bushings 26 and 28 are preferably made of nylon, since this material is hard and may be accurately machined to give any desired diameter that is required for the damping action. Furthermore, nylon will not attract dirt, is corrosion resistant, and thus gives a material which is well suited to give different sizes of calibrated openings for controlling the damping action. Preferably the nylon bushings have slots in the end for a screw driver by which they may be inserted or removed from the threaded openings in the cavities in the body 10 and plug 14.

Figure 1:
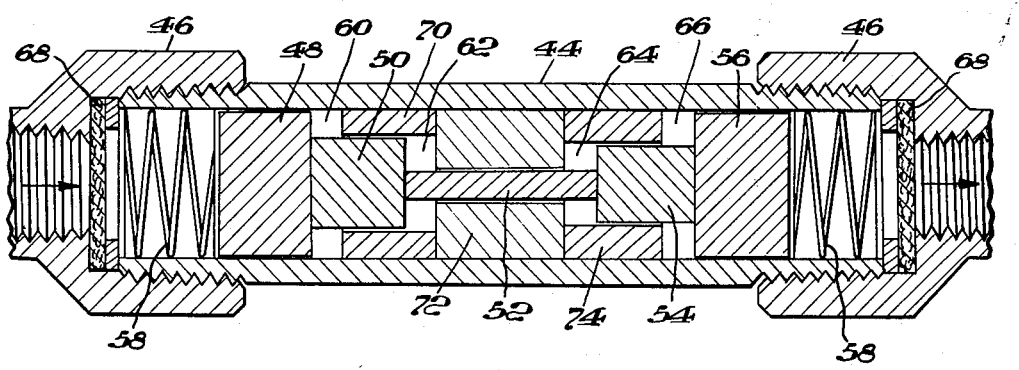
Fig. 1 is a vertical sectional view of a fluid flow controlling device embodying the present invention which is particularly adapted for differential displacement of fluid.

In Fig. 1 is illustrated a type of flow controlling device which is well adapted for the same uses as the device shown in Fig. 2. This device consists of a hollow cylindrical body 44 which has reducing nipples 46 threaded on each end. Within the body are mounted separated pistons 48, 50, 52, 54 and 56. Soft springs 58 are mounted within the cylinder 44 at each end thereof in order to hold the pistons assembled in a central position in the cylinder as shown in Fig. 1, when the device is not in operation. All of the pistons 48 to 56 normally move in unison through the cylinder when damping fluid flow. Pistons 48 and 56 have substantially the same diameter, the bore of the cylinder being calibrated around these pistons in order to provide a predetermined flow of fluid past the pistons. Cavities are formed within the cylinders at each side of each piston. The size of cavities 60, 62, 64 and 66 is important in that these cavities, together with the calibration of the bores around the pistons 50, 52 and 54 provide different flow velocities from cavity to cavity in securing the desired flow damping action. At each end of the cylinder 44 a screen or felt 68 is mounted in order to prevent the accumulation of dirt in the cylinder, particularly in the bores around the cylinders. The bores for the pistons 50, 52 and 54 are made by expanding rings 70, 72 and 74 into the central portion of the cylinder, the inner diameter of each ring being carefully calibrated to give the desired flow rate of fluid through the opening between the rings and the pistons. As one example, the opening 60 has a volume about 1.4 times the volume of opening 62. The opening 62 has a volume about 1.5 to 1 for the volume of opening 64, and the opening 64 has a volume 2.7 times the volume of opening 66. The volumes of these openings, together with the calibration of the bores and the diameters of the pistons will allow the piston train to move with the same velocity in opposite directions.

With the above construction it will be seen that the diameters of pistons 48, 50 and 52 are in a step-down sequence, and diameters of pistons 52, 54 and 56 are in step-up sequence. The total effective areas of the pistons 48, 50 and 52 is greater than the total effective areas of pistons 52, 54 and 56, but the volumes of the cavities on the opposite sides of the pistons 54 and 56 are greater than the volumes of the cavities on opposite sides of pistons 48 and 50, with the result that the differential of displacement will cause an equal fluid rate in opposite directions.

Figure 4:
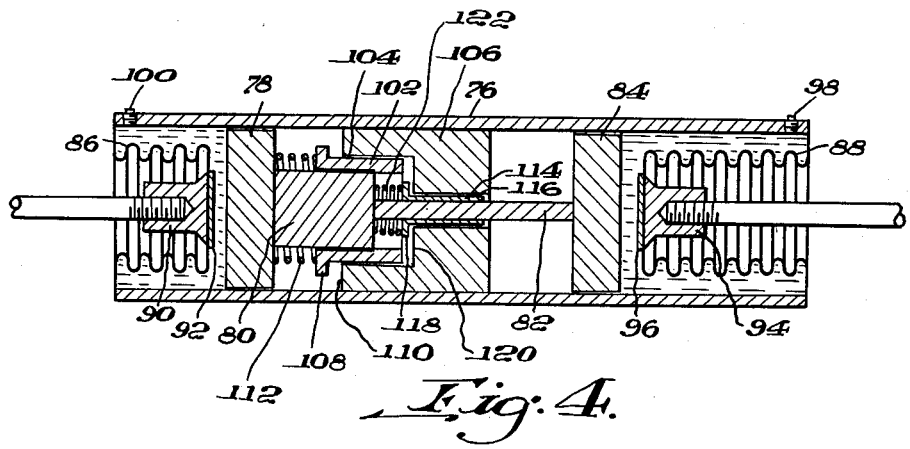
Fig. 4 is a vertical sectional view of another form of flow controlling device particularly adapted for obtaining different flow rates in opposite directions.

In Fig. 4 is illustrated the construction of a flow damping device which is particularly adapted for having a slower rate of movement in one direction than in the other. This flow damping device consists of a tubular body 76 having pistons 78, 80, 82 and 84 slidably mounted therein. Each of said pistons is independently movable in the tube 76. At opposite ends of the tube are secured flexible diaphragms or "Sylphons" 86 and 88 which make a liquid-tight connection with the ends of the tube. On the flexible diaphragm 86 is mounted a connecting member 90 having a plate 92 arranged to make contact with the piston 78 when pressure is placed on the connector 90 from an outside source. A connector 94 is mounted on the diaphragm 88 and has a plate 96 arranged to make contact with the piston 84 when pressure is placed on the connector from an outside source. The "Sylphons" are expansible to provide for the movement of a fluid within the tubular body 76. Plugs 98 and 100 are mounted in the ends of the tube 76 by which the cavities within the tubular member are entirely filled with oil or glycerine. Therefore when pressure is placed on either of the diaphragms 86 or 88 the oil will move to one end or the other and the flexible diaphragms will provide for the movement of the oil. Around the piston 80 is mounted a sleeve 102 within a bore 104 between the piston sleeve and an annular member 106 which is expanded into the tube 76 in a position to form the bore 104 for the piston 80. The sleeve has an outwardly-extending flange 108 which is normally moved into engagement with an abutment face 110 on the member 106 to close the bore 104, the sleeve being moved by means of a spring 112 positioned between the piston 78 and sleeve 102. A sleeve 114 is slidably mounted on piston 82 within a bore 116 formed between the sleeve and the member 106. An outwardly-extending flange 118 on the sleeve is arranged to move against an abutment face 120 on the member 106 to close the bore 116. This flange is normally held in closed position by means of a spring 122 mounted between the piston 80 and the flange 118.

The flow damping device illustrated in Fig. 4 is well adapted for use as a snubber for automobile springs. For example the connector 90 may be connected with the end of a spring and the connector 94 connected to the frame of the automobile. When the spring moves downwardly the plate 92 will be moved against the piston train to force the liquid from the diaphragm end 86 toward the diaphragm end 88. On the rebound the plate 96 will be pushed against the piston 84 to move the fluid from the diaphragm 88 toward the diaphragm 86. In this last movement the sleeves 102 and 114 will be moved to the left (Fig. 4) to open the bores 104 and 116 so that the flow of fluid on the return movement will be faster than the flow of fluid on the direct movement because the bores 104 and 116 are larger than the bores between pistons 80 and 82 and their respective sleeves 102 and 114. The bores on the inside and the outside of sleeves 102 and 114 are open for flow of liquid in one direction and only the bores between the sleeves and the pistons are open for a smaller flow capacity of liquid in the opposite direction. If it is desirable to have a rapid flow on the direct movement and a slow return on the rebound, then the connector 94 would be connected to the spring and the connector 90 would be connected to the automobile frame.

In Fig. 4 the pistons are all shown in separated position, but it is understood that after the device has been put in operation the pistons will contact one another and move as a unit. The device of Fig. 4 is well adapted for a snubber for a door closer or for a recoil mechanism in that it can be accurately adjusted to control the rate of movement in either direction.

Figure 5:
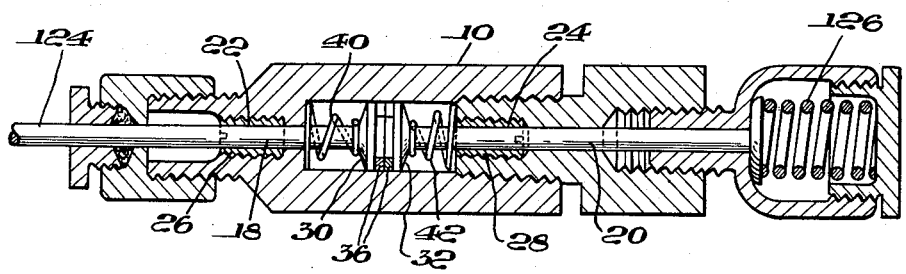
Fig. 5 is a vertical sectional view of the flow controlling device shown in Fig. 2 which is equipped for use as a recoil apparatus.

In Fig. 5 is illustrated the use of the flow control device shown in Fig. 2 for a gun recoil mechanism. In this arrangement a stem 124 is connected with the piston chain in the body 10, this stem in turn being connected with the movable part of the gun to control the recoil. On the pressure stroke, the pistons will be moved to the right (viewing Fig. 5) and compress a spring 126 in the end of the flow control device. The spring in turn will react to move the piston train in the opposite direction and the fluid flow around the pistons 18 and 20 will control the recoil action of the flow controller. Since the spring will not have the power of a gun, the recoil movement will be much slower than the direct movement.

The flow control device of Fig. 1 may be used for controlling the flow in a pressure line connected with a measuring instrument, in which case it preferably is desirable that the pistons 50 and 54 should have the same diameter and the cavities 62 and 64 should have the same volume capacity. With this construction the pulsation of the measuring instrument needle based on the pressure developed by a pump or compressor may be dampened and controlled to give any desired reading.

It will be seen that the construction of the flow control devices of Figs. 1, 2 and 4 are well adapted to be mounted in any desired position for connection with the fluid pressure lines in which the flow is to be controlled. Each form of flow damping device involves a differential displacement of fluid for controlling the rate of movement.

The preferred form of the invention having been thus described, what is claimed as new is:

1. A fluid flow rate damping device comprising a body with a tubular opening extending therethrough and having pipe connections at each end thereof, a central piston mounted for reciprocation in a bore in the body, a piston of smaller diameter than the central piston connected to the central piston at each side thereof, said smaller diameter pistons being mounted to reciprocate in bores near each end of the tubular body, the bores of the smaller pistons being of calibrated diameter slightly larger than the diameter of the pistons to permit a regulated fluid flow past the pistons.

2. The flow damping device defined in claim 1 in which the central piston is provided with piston rings which are constructed to prevent the flow of fluid past the central piston after the bore at the central side of each piston is filled with fluid.

3. The flow damping device defined in claim 2 in which the piston rings are made of "Teflon."

4. The flow damping device defined in claim 2 in which the piston rings are split and the split of each ring is positioned adjacent a solid body portion of the adjacent ring.

5. The flow damping device defined in claim 1 in which the central piston is made up of heads constructed to loosely slide in the tubular bore of the body, and piston rings tightly fitting the tubular bore are mounted between the heads.

6. The flow damping device defined in claim 5 in which a small diameter piston is connected to each head whereby the central and end pistons reciprocate in unison in the tubular body.

7. The flow damping device defined in claim 1 in which springs are mounted in each end of the tubular body to hold the pistons in center position in the body bore when the device is not in operation.

8. The flow damping device defined in claim 1 in which the bores for the smaller diameter pistons are formed in bushings which are threaded into the opposite ends of the body, whereby bushings having different internal diameter bores may be used in the body to modify the differential displacement of fluid through the bore around the piston in accordance with the fluid being operated upon.

9. The fluid flow rate damping device defined in claim 8 in which one bushing is threaded into one end of the body and the other bushing is threaded into a plug removably mounted in the other end of the body.

10. The fluid flow damping device defined in claim 8 in which the bushings are made of nylon.

11. A fluid flow rate damping device comprising a tubular body having pipe connecting means at each end thereof, a series of separate pistons of different diameters constructed for movement in unison, calibrated bores in the body in which the pistons are mounted, the pistons at each end of the series having the same diameter and the bore for each end piston having a diameter slightly greater than the diameter of the piston to permit the flow of fluid through the bore around the piston.

12. The flow damping device defined in claim 11 in which the diameters of adjoining pistons decrease in sequence from the inlet end to the central portion of the body and then increase from the central portion of the body to the outlet end thereof, and the bores for the pistons intermediate the end pistons are slightly greater than the diameters of the pistons to permit the flow of fluid around the pistons.

13. The flow damping device defined in claim 12 in which the sum of the diameters of the pistons in step-down sequence is greater than the sum of diameters of the step-up sequence.

14. A fluid flow rate damping device comprising a tubular body having means at each end thereof for connection to a movable member, the movement of which is to be dampened, a series of pistons of different diameters slidably mounted in the tubular body, said pistons being constructed for movement in unison in opposite directions by fluid under pressure acting on a piston at one end of the series and then in opposite direction on the piston at the other end of the series, and calibrated bores surrounding the pistons of such diameters compared with the diameters of the pistons that the rate of movement of the pistons depends upon the rate of fluid flow through the bores around the pistons.

15. The flow damping device defined in claim 14 in which the bores are larger than the pistons to provide cavities at each side of each piston to and from which fluid passes around the pistons as the pistons reciprocate.

16. The flow damping device defined in claim 15 in which a flexible diaphragm is mounted in each end of the tubular body having a plate attached thereto for contacting the end pistons of the series, and a non-expandable liquid is inserted to fill all cavities on the inside of the tubular body between the diaphragms.

17. The flow damping device defined in claim 16 in which the diaphragms are "Sylphon" tubes that close each end of the tubular body to enclose the pistons in a liquid-tight chamber, and the connecting means at each end of the body is secured to a plate attached to the Sylphon for engaging the piston train at its respective end of the series.

18. The flow device defined in claim 16 in which a cylindrical sleeve surrounds and is slidably mounted on an intermediate piston of the series, the calibrated bore in said body for said sleeve having a diameter slightly greater than the outside diameter of the sleeve to provide a channel for the passage of fluid between the bore and the sleeve, said sleeve having an outwardly extending flange with an outer diameter greater than the diameter of the bore, and a spring mounted between the flange and an adjacent piston normally acting to force the flange to cover the channel between the sleeve and the bore to cut off flow of fluid through the channel.

19. The flow damping device defined in claim 16 in which cylindrical sleeve surround and are slidably mounted on each of said intermediate pistons of the series, the calibrated bores in said body for each of said sleeves having a diameter which provides a fluid passage channel between the bore and the sleeve, one end of each sleeve having an outwardly extending flange of greater outer diameter than the diameter of its respective bore, and a spring mounted between the flange of each sleeve and its adjacent piston normally acting to force the flange of each sleeve to cover its bore to cut off flow of fluid through the channel between the sleeve and the bore.

20. The flow damping device defined in claim 19 in which channels are formed between the sleeves and the pistons which have a smaller flow capacity than the flow capacity of the channels between the respective sleeves and their bores whereby pressure movement of liquid in one direction against the flanges will cause the flanges to close the larger flow capacity channels, and pressure flow of fluid in the opposite direction will open the channels having a larger flow capacity to give different dampening flow rates in the opposite directions.

References Cited in the file of this patent

FOREIGN PATENTS

| Number | Country | Date |
|---|---|---|
| 349,520 | Great Britain | May 27, 1931 |